US012591375B2

(12) United States Patent
Pathirakani et al.

(10) Patent No.: US 12,591,375 B2
(45) Date of Patent: Mar. 31, 2026

(54) DATA STORAGE DEVICE AND METHOD OF ACCESS IN CONFIDENTIAL MODE AND NORMAL MODE

(71) Applicant: Sandisk Technologies, Inc., Milpitas, CA (US)

(72) Inventors: Ganesh Kumar Pathirakani, Kovilpatti (IN); Nagarajan Ragupathy, Bangalore (IN); Ashutosh Kumar, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 120 days.

(21) Appl. No.: 18/589,424

(22) Filed: Feb. 28, 2024

(65) Prior Publication Data

US 2025/0272007 A1     Aug. 28, 2025

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC .... G06F 3/0622; G06F 3/0655; G06F 3/0679; G06F 21/78; G06F 21/74
USPC ........................................................ 726/17
See application file for complete search history.

(56) References Cited

U.S. PATENT DOCUMENTS

| | | | | |
|---|---|---|---|---|
| 9,129,120 | B2 | 9/2015 | Garcia et al. | |
| 10,868,679 | B1 * | 12/2020 | Van Antwerpen | .... H04L 9/0894 |
| 12,105,978 | B2 * | 10/2024 | Peisakhov | ............. G06F 3/0622 |
| 2009/0228639 | A1 * | 9/2009 | Cho | ........................ G06F 21/79 |
| | | | | 711/E12.001 |
| 2010/0077214 | A1 | 3/2010 | Jogand-Coulomb et al. | |
| 2012/0099219 | A1 * | 4/2012 | Al-Azzawi | ............. G06F 21/56 |
| 2013/0318358 | A1 * | 11/2013 | Wang | .................... H04L 9/0866 |
| | | | | 713/182 |
| 2014/0201850 | A1 * | 7/2014 | Garcia | .................. H04L 9/0894 |
| | | | | 726/28 |
| 2018/0239912 | A1 | 8/2018 | Welch et al. | |

FOREIGN PATENT DOCUMENTS

WO      WO2008008245 A2      1/2008

* cited by examiner

*Primary Examiner* — Teshome Hailu
*Assistant Examiner* — Lawrence Q Truong
(74) *Attorney, Agent, or Firm* — Patent Law Works LLP

(57) ABSTRACT

A data storage device (DSD) (1) comprising: a storage medium (13); and at least one flash interface module (FIM) (27), wherein in response to a signal (4) of a switch (3) is configured to selectively transition operation of the DSD (1) between two modes. A confidential mode, in which security data (7) is stored with user data (9) as protected data (11) in the storage medium (13) of the DSD (1) during a write operation (15), and the security data (7) is used to validate subsequent requests to access (17), or modify, the corresponding stored user data (9). A normal mode, in which access to the protected data (11) is prevented.

20 Claims, 5 Drawing Sheets

DATA STORAGE DEVICE AND METHOD OF ACCESS IN CONFIDENTIAL MODE AND NORMAL MODE

TECHNICAL FIELD

The present disclosure relates to a secure data storage device and method of securely accessing and modifying user data.

BACKGROUND

It is important to protect confidential data from a data storage device. Without protection, one can steal confidential data from a data storage device left unattended by simply copying the confidential data from the data storage device to another storage medium.

In some examples, the data storage devices can include a storage medium including solid state drive (SSD) using NAND flash memory. SSDs can have firmware that, when operating, by a flash interface module (FIM) manage access to and from a plurality of flash memory units (FMU) of the storage medium.

SUMMARY

In a first aspect, the present disclosure relates to a data storage device (DSD) comprising: a storage medium); and at least one flash interface module (FIM), wherein in response to a signal of a switch is configured to selectively transition operation of the DSD between a confidential mode and a normal mode. The confidential mode, in which security data is stored with user data as protected data in the storage medium of the DSD during a write operation, and the security data is used to validate subsequent requests to access, or modify, the corresponding stored user data. The normal mode, in which access to the protected data is prevented.

In some examples of the DSD, the at least one flash interface module (FIM), in response to requests to access, or modify, the protected data from a host device, and in the confidential mode, is configured to: receive the corresponding security data of the protected data from the storage medium; and generate a calculated security data based on a DSD identifier of the DSD and a user identifier provided by the host device; and verify a user based on the corresponding security data being consistent with the calculated security data. In response to verifying the user, the FIM is configured to validate requests to access to enable a data path for the user data between the storage medium and the host device in the confidential mode.

In some examples, the DSD is configured to store the DSD identifier of the DSD in the storage medium, or another storage medium of the DSD siloed from the storage medium.

In some examples, the storage medium comprises a plurality of flash memory units (FMU), and wherein each FMU is configurable to store respective protected data, wherein the respective protected data includes respective security data and at least part of the user data.

In some examples, during a write operation in the confidential mode, the at least one FIM selectively configures one or more of the plurality of FMUs to store respective protected data, wherein the FIM is configured to: generate respective security data for the respective protected data to be stored at the one or more of the plurality of FMUs, wherein the respective security data is based on the DSD identifier of the DSD and the user identifier; store the respective security data in a respective FMU header of the one or more of the plurality of FMUs; and store, at least in part, user data as protected data at the one or more of the plurality of FMUs.

In some examples of the DSD, the corresponding stored user data as protected data is encrypted, at least in part, with the security data.

In some examples of the DSD, one or more of the plurality of FMUs is further configurable as an unprotected FMU to store unprotected data.

In some examples of the DSD, when in the normal mode, the FIM is configured to: disable access to any user data in the one or more plurality of FMU that contains protected data; and enable access to unprotected data in corresponding unprotected FMU.

In some examples of the DSD, during a write operation in the normal mode the at least one FIM selectively configures one or more of the plurality of unprotected FMUs to store respective unprotected data.

In some examples of the DSD, the switch comprises: a hardware switch operable by a user; and/or a software switch operable through a user interface of a host device.

In another aspect, the present disclosure provides a computer-implemented method for selectively enabling access to user data stored in storage medium of a data storage device (DSD), the computer-implemented method performed, at least in part, by at least one flash interface module (FIM) of the DSD, the method comprising: receiving a signal from a switch; wherein in response to the signal, the method includes the DSD transitioning operation between a confidential mode and a normal mode. The confidential mode, in which security data is stored with user data as protected data in the storage medium of the DSD during a write operation, and the security data is used to validate subsequent requests to access or modify the corresponding stored user data. The normal mode, in which access to the protected data is prevented.

In some examples of the method, wherein in response to requests to access, or modify, the protected data from a host device in the confidential mode, the method comprises: receiving corresponding security data of the protected data from the storage medium; generating a calculated security data based on a DSD identifier of the DSD and a user identifier provided by the host device; verifying a user based on the corresponding security data being consistent with the calculated security data; and in response to verifying the user, validating requests to access to enable a data path for the user data between the storage medium and the host device in the confidential mode.

In some examples, the method further comprises: receiving, from the host device, the user identifier, wherein the user identifier is a secret associated with the user.

In some examples, the method further comprises: receiving the DSD identifier of the DSD from the storage medium, or another storage medium of the DSD siloed from the storage medium.

In some examples, the storage medium comprises a plurality of flash memory units (FMU), and wherein each FMU is configurable to store respective protected data, and wherein the respective protected data includes respective security data and at least part of the user data, wherein in response to requests to access or modify the protected data the method further comprises: identifying one or more FMU that contain the requested protected data; and for each of the identified one or more FMU, the method includes verifying the user based on the respective security data of the FMU being consistent with the calculated security data; and in response to verifying the user validating request to access the protected data in the identified one or more FMU.

In some examples, wherein during a write operation in the confidential mode, the at least one FIM selectively configures one or more of the plurality of FMUs to store respective protected data, wherein the method further comprises: generating respective security data for the respective protected data to be stored at the one or more of the plurality of FMUs, wherein the respective security data is based on the DSD identifier of the DSD and the user identifier; storing the respective security data in a respective FMU header of the one or more of the plurality of FMUs; and storing, at least in part, protected user data at the one or more of the plurality of FMUs.

In some examples of the method, wherein storing the protected user data further comprises encrypting the user data, at least in part, with the security data.

In some examples, the respective security data for each FMU is stored in a corresponding FMU header of the FMU, wherein receiving corresponding security data of the protected data from the storage medium includes receiving the respective security data from the FMU header.

In some examples, one or more of the plurality of FMUs is further configurable as an unprotected FMU to store unprotected data, wherein in the normal mode, the method further comprises: disabling access to any user data in the one or more plurality of FMU that contains protected data; and enabling access to unprotected data in corresponding unprotected FMU.

In some examples of the method, wherein during a write operation in the normal mode, the at least one FIM selectively configures one or more of the plurality of the unprotected FMUs to store respective unprotected data, the method further comprising: storing, at least in part, respective unprotected data at the unprotected FMUs.

In another aspect, the present disclosure provides a data storage device (DSD) comprising: means for storing data; means for receiving a signal from a switch; and means for transitioning operation, in response to the signal, is configured to selectively transition operation of the DSD between: (i) a confidential mode in which security data is stored with user data as protected data in the storage medium of the DSD during a write operation, and the security data is used to validate subsequent requests to access, or modify, the corresponding stored user data; and (ii) a normal mode, in which access to the protected data is prevented.

In some examples, the data device further comprises: means for receiving requests to access, or modify, the protected data from a host device in the confidential mode; means for receiving corresponding security data of the protected data from the storage medium; means for generating a calculated security data based on a DSD identifier of the DSD and a user identifier; means for verifying a user based on the corresponding security data being consistent with the calculated security data; and in response to the verifying the user, means for validating requests to access, or modify, to enable a data path for the user data between storage medium and the host device in the confidential mode.

DESCRIPTION OF EMBODIMENTS

In the following detailed description, various aspects of a data storage device in communication with a host device will be presented. These aspects are suited for flash storage devices, such as SSDs (solid-state drive) and SD (Secure Digital) cards. However, those skilled in the art will realize that these aspects may be extended to other types of data storage devices capable of storing data. In yet further examples, the data storage device can be a combination of flash memory and magnetic storage such as a hybrid drive. Accordingly, any reference to a specific apparatus or method is intended only to illustrate the various aspects of the present disclosure, with the understanding that such aspects may have a wide range of applications without departing from the spirit and scope of the present disclosure.

Overview

Figure 1:
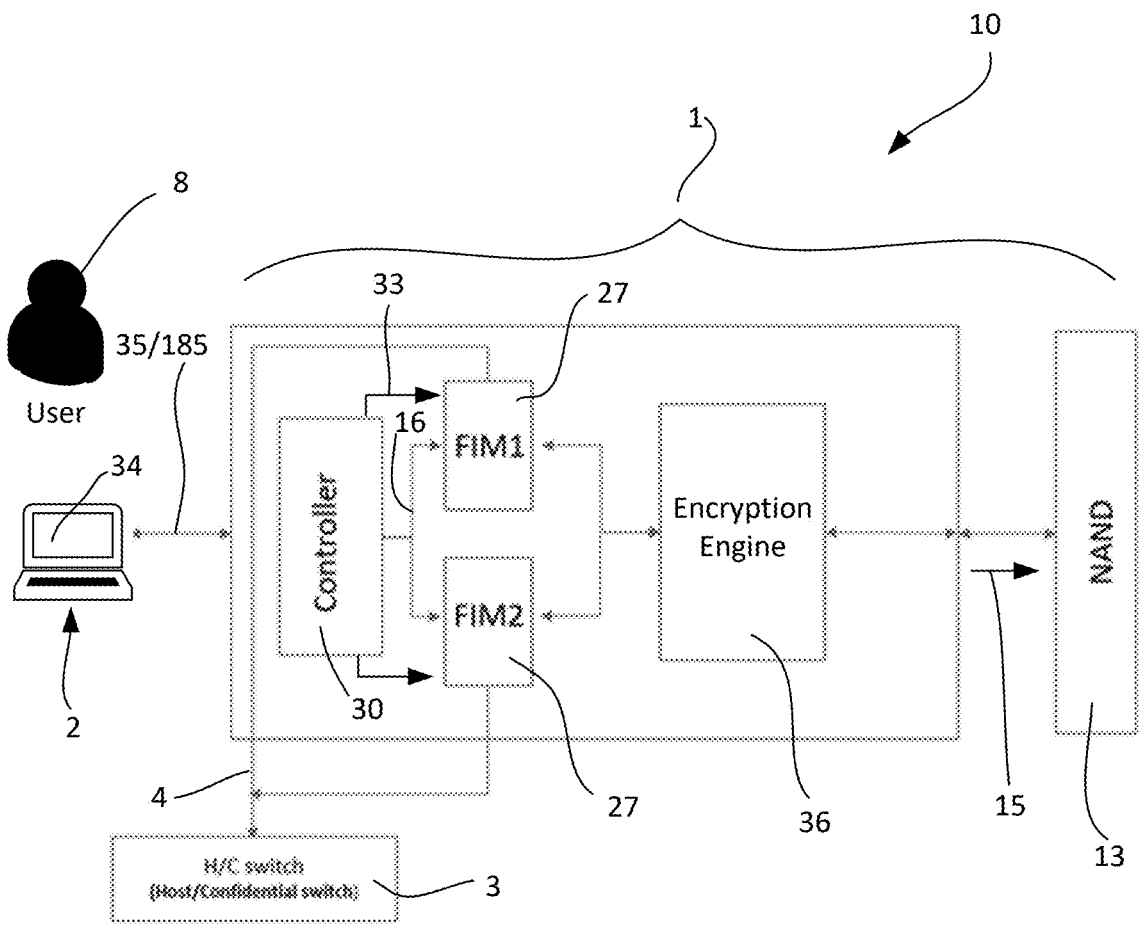
FIG. 1 is a schematic of a system including a data storage device in communication with a host device in accordance with a first example.

FIG. 1 illustrates a system 10 including a data storage device (DSD) 1 that is in communication with a host device 2.

The host device 2 and the data storage device 1 may form part of a system 10, such as a computer system (e.g. server, desktop, laptop, tablet, smartphone, etc.). In this illustrated example, the components of FIG. 1 are physically co-located. However, in other examples the host device may be located remotely from the data storage device.

Figure 3:
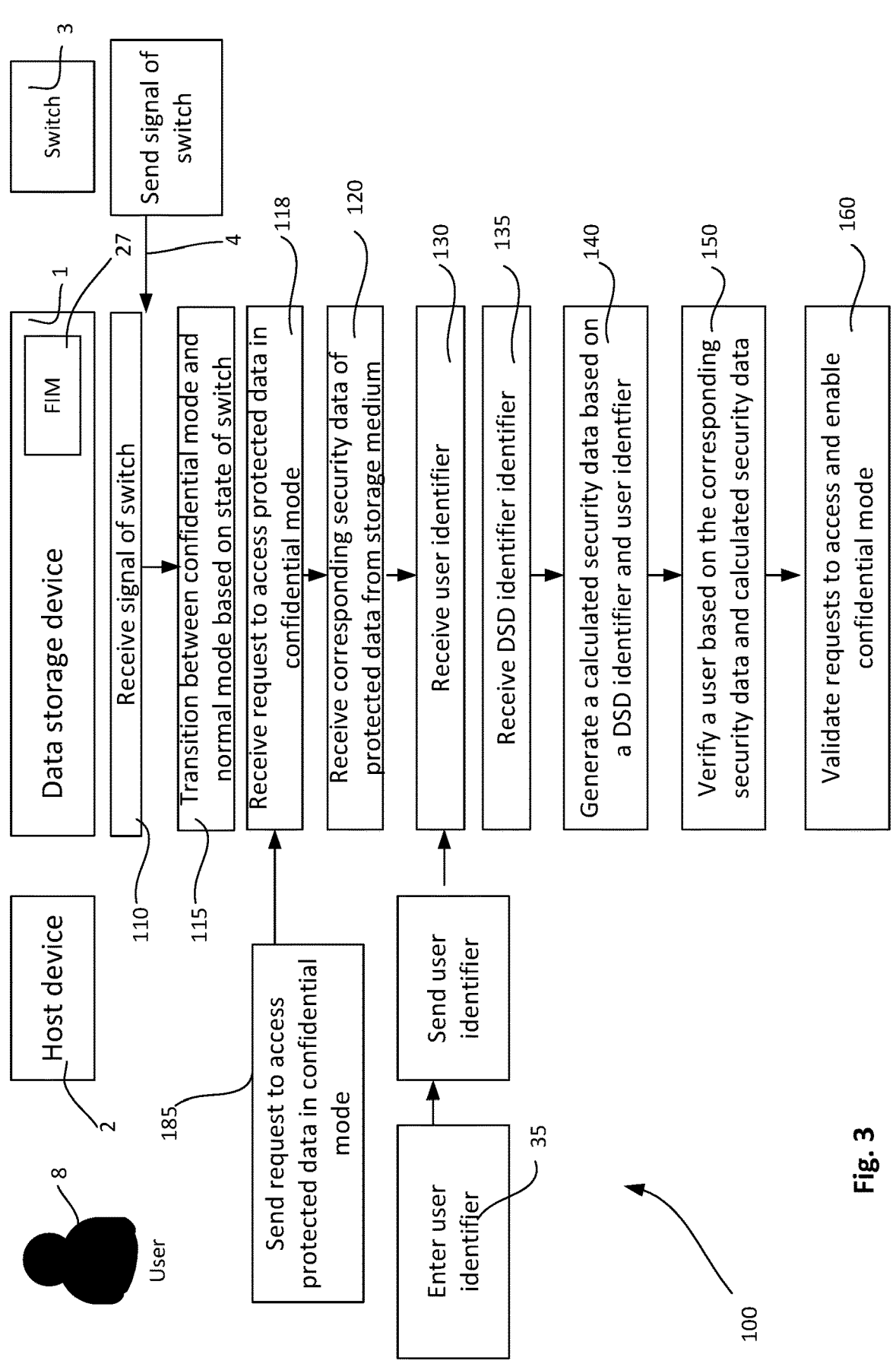
FIG. 3 is a flow diagram of a method of accessing user data in a data storage device in a confidential mode.

The system 10 and method 100 disclosed herein enables the data storage device 1 to selectively operate between a confidential mode and a normal mode. In some examples, a switch 3 is configured to enable a user 8 to selectively transition operation of the DSD 1. This is illustrated in FIG. 3 where the method includes receiving 110 a signal 4 from the switch 3 and to transition 115 between the confidential mode and the normal mode based on the signal 4.

Figure 2:
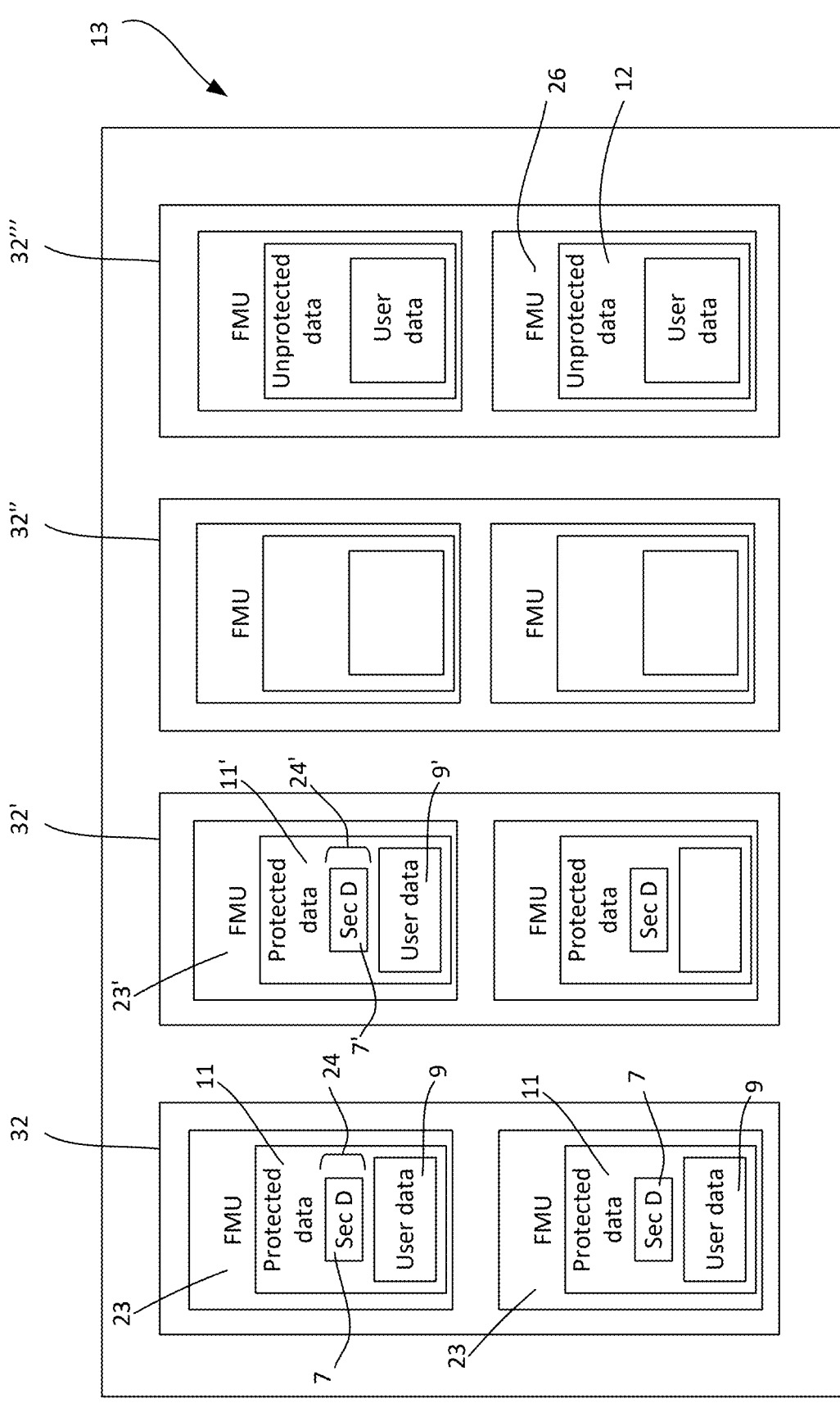
FIG. 2 is a schematic of a storage medium of the data storage device of FIG. 1 including a plurality of flash memory units.

The confidential mode enables user data 9 to be securely stored in a storage medium 13. In particular, security data 7 (as illustrated in FIG. 2) is stored with user data 9 as protected data 11 in the storage medium 13 during a write operation 15. The security data 7 is used to validate subsequent requests to access, or modify, the corresponding stored user data 9.

In the normal mode, access to the protected data 11 is prevented. In some examples, the normal mode is configured to enable writing of unprotected data, as well as access and modification of such unprotected data by the host device 2. This can include enabling such writing, access, and modification rights without validating the user of the host device.

In some examples (as schematically illustrated in FIG. 2) the storage medium 13 includes flash memory that comprises a plurality of flash memory units (FMU) 23/26 to store protected data 11 and/or unprotected data 12. At least one flash interface module (FIM) 27 functions as a multiplexer to enable data paths 16 between the FMU 23 and the host device 2. Importantly, when a valid request to access is made the FIM 27 is configured to enable a data path 16 for the user data 9 between the FMU 23 and the host device.

An example of a method of determining a valid request is illustrated in FIG. 3 that shows steps in the method 100 to selectively enable access to the user data 9 in the confidential mode.

The host device 2 sends 185 one or more request to access the protected data 11 (such as user data 9) that is received 118 at the data storage device 1. The method includes receiving 120 corresponding security data 7 associated with the protected data 11 from the storage medium 13.

The method also includes generating 140 a calculated security data 31 that is based on a DSD identifier 33 associated with the DSD 1 and a user identifier 35 provided by the host device 2. The DSD identifier 33, ideally, is a unique to the DSD 1. In some examples, the DSD identifier 33 can be a serial number or code, and in other examples this can be a secret code or key. The user identifier 35 may be a secret known to the user(s) 8 (such as a personal identification number or password) who should be authorized to access the user data 9. Thus the calculated security data 31 can only be generated when there is a combination of a user 8 providing (via host device 2) the user identifier 35 that is using the particular DSD 1.

The method further includes verifying 150 the user 8 based on the corresponding security data 7 being consistent with the calculated security data 31. In some examples, this may include the corresponding security data 7 being the same as the calculated security data 31 (that is, similar to a shared secret). In other examples, the corresponding security data 7 may be similar to, or share similar characteristics, as the calculated security data 31. In yet other examples, the corresponding security data 7 may be used to verify a relationship with the calculated security data 31. For example, the calculated security data 31 may result in a private key and the corresponding security data 7 is a corresponding public key (of a pair of private and public keys). It is to be appreciated other variations of determining consistency, such as other known relationships, can be used to verify the user 8 based on the calculated security data 31 and the stored corresponding security data 7.

In some examples, verification of the user based on the security data being consistent with the calculated security data may including subset matching of the security data and calculated security data. This can include multi-user verification techniques suitable for cases where multiple users are sharing the protected data.

In response to successfully verifying 33 the user 8, the method includes validating 160 request(s) to access the protected data 11. This includes enabling a data path 16 for the user data 9 between the storage medium and the host device 2 in the confidential mode.

In some examples, once the device has been validly switched to the confidential mode the user 8 can continue to operate in the confidential mode for the session without additional verification of the user 8. That is, it is not necessary to verify the user for every write or read operation. The session may end when the DSD 1 is disconnected (or ejected) or if there is a switch to the normal mode. After this, subsequent use of confidential mode by the user 8 may require further verification of the user 8.

The above-mentioned system 10, data storage device 1, and method 100 can prevent a nefarious actor who has gained physical control of the data storage device from simply removing the storage medium 13 from the DSD 1 and accessing or copying the data directly from the storage medium 13. This is prevented in two ways. Firstly, the nefarious actor would not have the user identifier 35. Secondly, the nefarious actor (and their devices) may not have the DSD identifier 33 to enable the FIM 27 to access the data path.

In some examples, an advantage of operating at the FIM 27 level of user data at individual FMU 23 is increased granularity, flexibility, and control, and to enable dynamic allocation of memory based on user needs and enabling use for multiple users. That is, enabling users to store as much data (in the confidential mode) into the storage medium as available in the storage medium. This may be in contrast with existing devices, where a user can store data with encryption technologies like SED (self-encrypting drives) or with password protection either for the whole drive or to dedicated logical spaces which needs additional encryption (such as in hardware or software) to enable data privacy.

Data Storage Device

FIG. 1 illustrates a schematic of a data storage device 1 connected to a host device 2. The data storage device 1 may be connected to communicate with the host device 2, such as via a physical data cable. This can include a DSD 1 in the form of a portable device that can be used (at separate times) with more than one host device 2. In some examples, the DSD 1 may be in wireless communication with the host device 2, either directly, or via a communications network (not shown). The DSD 1, in particular examples, is a portable data storage device utilizing flash memory storage as the storage medium 13.

Controller 30

The DSD 1 includes a controller 30 that includes one or more processing devices to perform one or more operations on the DSD 1. This can include executing instructions from firmware and/or to perform operations on the DSD 1. This can include functions, such as those of known DSD and SSD controllers such as communication with the host device 2, wear leveling, error correction, garbage collection, etc.

The DSD may be configured so that the controller 30 is part of the data path from the FIM 27/storage medium 13 to the host device 2.

Switch 3

In this example, the DSD 1 includes a physical hardware switch 3 to enable a user 8 to operate and indicate a desired confidential mode or a normal mode. In this example, the signal 4 from the switch is received at the FIM 27. However it is to be appreciated that the signal 4 indicative of the user selection may be received by the FIM 27 indirectly. For example, the signal 4 from the switch may be sent to the controller 30 that in turn passes a signal to the FIM 27.

It is to be appreciated that in some alternatives, the switch 3 may be a software-implemented switch 3 operable via a user interface 34 associated with the host device 2. In yet another example, the switch 3 may be software-implemented based on other conditions. For example, it may be specified that a particular host device 2 operates in the confidential mode with a specified DSD 1. Thus DSD 1 may default to operate in the confidential mode (but subject to receiving a valid user identifier 35 to enable access). In other examples, the DSD 1 is configured to operate in a confidential mode at specified time(s) of the day, or on specified date(s), whereby the DSD 1 will attempt to operate in the confidential mode (but also subject the valid user identifier 35). It is to be appreciated the converse can also be implemented, where alternative conditions result in a software switch 3 to operate the DSD 1 in the normal mode.

In yet further examples, the software-implemented switch may be triggered (or otherwise controlled) by another hardware switch 3. For example, the software-implemented switch could be controlled via a wireless interface to another hardware component/switch. In some examples, this may include communication via Bluetooth (including Bluetooth Low Energy protocols), Wi-Fi protocols etc. This can be useful for DSDs that have Bluetooth, Wi-Fi, or other wireless support.

Flash Interface Modules (FIM)

The DSD 1 also includes one or more flash interface modules (FIM) 27 that interface directly with the FMU 23 in the storage medium 13. They functionally enable, at least in part, a data path between and the host device 2 as noted above. More specifically, the flash interface modules provide a communication interface between the flash memory units in the storage medium 13 and the controller 30 (which in turn communicates with the host device).

The disclosed FIM 27, in addition to functions of known FIM, is operating to provide access control to protected data. The FIM 27 is configured to perform the method 100 described in a separate section below.

In some examples, the FIM 27 has an input pin in communication with the switch 3 of the drive 1. This enables the FIM 27 to receive a signal 4 indicative of a selection by a user to use the confidential mode or the normal mode.

In other examples, the FIM 27 may receive the indication of the selection of the switch 3 via other communication channels. For example, where the switch is based on operation of a user interface 34, the FIM 27 may receive the signal via the controller 30, that in turn is in communication with the host device 2, which in turn is in communication with the user interface 34.

When the confidential mode is selected, the FIM 27 is configured to receive DSD identifier 33 of the DSD 1. In some examples, the DSD identifier 33 is received from the controller 30. In other examples, the DSD identifier 33 is securely stored in another storage medium that is separate, and siloed, from the storage medium 13 used for user data. This may be advantageous so that if a person removes the storage medium 13, the DSD identifier 33 cannot be accessed directly from that storage medium 13 which may increase security.

However in alternative examples, the DSD identifier 33 may be stored in a part of the storage medium 13 that is used for protected data 11.

In some examples, as discussed above, the DSD identifier 33 is secret or obfuscated to provide additional security against nefarious actors. However, it is to be appreciate that in alternative examples the DSD identifier 33 is not a strict secret. For example, the DSD identifier 33 is a serial number of the device.

In further examples, the DSD identifier 33 may be user defined. For example, a user 8 may specify a DSD identifier 33 to be used with the DSD 1. In yet other examples, each user 8 of a device may assign a respective DSD identifier 33 for the device. In further examples, a user may have a choice of using a default DSD identifier 33 (such as a serial number) or to specify a DSD identifier 33 to be used. In some examples, the user specified DSD identifier 33 may be encrypted and stored in the DSD.

Encryption Engine 36

The DSD 1 may include additional hardware or software encryption engines 36 to add another layer of security. This may include other known data security protocols to obfuscate user data stored in the storage medium. This may be applied when in the confidential mode. In some examples, encryption may also be applied in the normal mode.

In some examples, the encryption engine 36 may encrypt the user data, at least in part, with the security data 7.

Storage Medium and Flash Memory Unit (FMU)

Referring to FIG. 2. the storage medium 13, in this example includes flash memory. This may include a plurality of blocks 32, where each block is the smallest unit that can be erased. Each block contains a plurality of FMU 23/26, where the FMU is the smallest data chunk that the can be used to read or write to the flash memory. Because each block is the smallest unit that can be erased, to erase or modify data in one FMU 23/26 involves erasing a block 32 and rewriting the block (or to a new block).

In one example, each FMU 23/26 may contain up to 4 KB of data (from 8 sectors of 512 bytes for each sector). The storage medium 13 may be packaged in one (or more) units that are mounted to a circuit board via a ball grid array (BGA). In case the storage medium 13 is removed from the device 1 by an unauthorized user, they would not be able to access protected data 11 in the storage medium 13 since they would not have the DSD identifier 33 nor the user identifier 35.

Referring to the left-hand side of FIG. 2, each FMU 23 is configurable to store respective protected data 11, wherein the respective protected data 11 includes respective security data 7 and protected user data 9. The security data 7 may be stored in an FMU header 24 of that FMU 23.

The FMU 23 may also be configurable as an unprotected FMU 26 to store unprotected data 12 as shown at the block 32''' on the right-hand side of FIG. 2. The blocks 32 and FMU 23/26, when free (as 32") can be used for either confidential or normal modes. That is, it is not necessary to predefine or lock in advance which particular memory regions, blocks, or FMU will be used for confidential or normal modes. Instead, the FMU or blocks may be specified on the fly (i.e. as they are written and used).

FIG. 2 illustrates a "block-based" example where each block 32, if used in confidential mode, only stores user data for that particular user 8. Thus the first block 32 has two FMU 23, where each FMU contains protected data of the same user 8 in the confidential mode. Thus the security data 7 of the two FMU 23 are identical, or are functionally identical, so that the same user identifier 35 can be used to generate calculated security data 31 to enable access to user data 9 of both FMUs 23.

If another user (with their own user identifier) writes to the DSD 1, then another block 32' will be used to write the protected data, whereby the respective FMU headers 24' will be written with security data 7' based at least in part of that other user's identifier.

Figure 4:
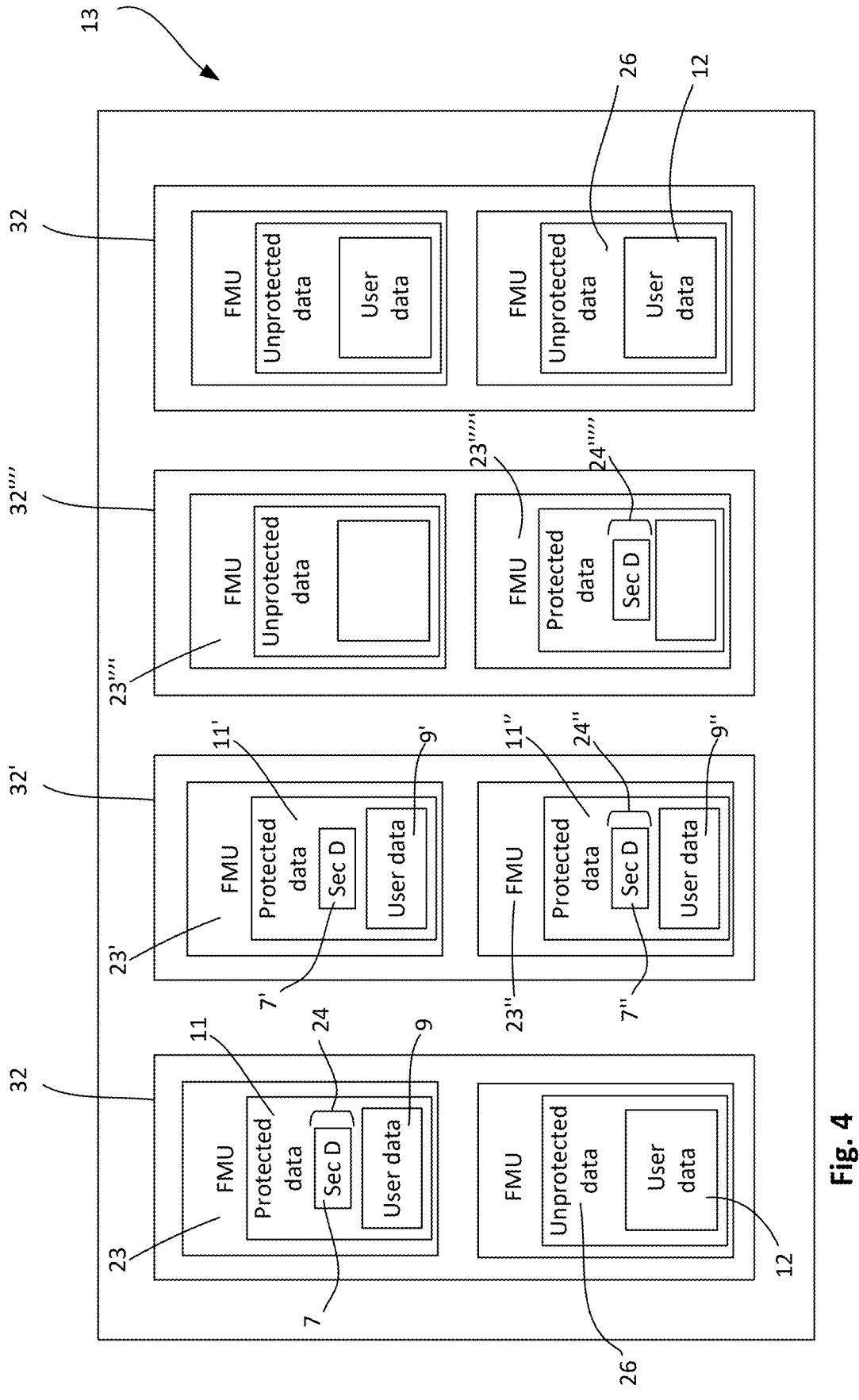
FIG. 4 is a schematic of a storage medium of the data storage device in an alternative configuration with blocks containing both protected user data and unprotected user data.

FIG. 4 illustrates another alternative as a "signature tracking example" where a single block 32 may contain both protected data 11 and unprotected data 12. The restriction is that each FMU 23, 26 that is used will contain either protected or unprotected data. In this example, this can increase utilization of memory as it will be possible to write to the block with both unprotected and protected data to fill up the block before opening another block. However, the trade-off is that this can complicate deletion or formatting, when a block contains a mix of unprotected and protected data, or protected data with different users. For example (with reference to left-hand block 32 of FIG. 4), if the unprotected data 26 needs to be deleted, this cannot be done during normal mode as the entire block 32 will need to be erased which will affect (or require access to) protected data 11 in FMU 23.

The second block 32' of FIG. 4 illustrates a block 32' with two FMU 23', 23" that holds respective protected data 11', 11" of two users. With the FIM verifying access requests, this enables security of the protected data of different users even if the protected data 11', 11" is saved on the same block 23'. As there is protected data of two users in the same block, garbage collection process may move the protected data for better block utilization (as will be discussed in further details below).

Host Device and User Identifier 35

The host device 2 can be a computer system, computer, laptop, tablet, smartphone, etc. In some examples, the host device 2 can include other electronic devices that is configured to host a data storage device 1. For example, a smart television, a gaming console, a security camera system, other data recording device, etc. This may be useful for cases where information needs be written and/or accessed securely.

When the host device 2 is used in the confidential mode, the user identifier 35 needs to be communicated to the DSD 1. This can include the user 8 entering the user identifier 35 through a user interface 34 associated with the host device 2. Alternatively, the host device 2 may store the user identifier 35 (such in a digital wallet at the host device 2). In yet other examples, the user identifier 35 may be stored remotely at a server that can be accessed by the host device 2. The host device 2 sends the user identifier 35 to the DSD 1, which can include sending via the controller 30 to the respective FIM 27.

In some examples, the user identifier 35 is a secret for a respective user 8. Thus access to the user data 9 is limited to that user. This can include a user identifier 35 that is a cryptographic key. In some examples, the user identifier 35 may be a combination (or based on a combination) of a public username and a secret password.

In examples where multiple users wish to collaborate, they may share a common user identifier 35. That is, the user identifier 35 is shared with multiple users who will use the same user identifier 35 (from their host device) to access the protected data in the DSD 1.

Modes of Operation

The two main modes of operation, being the confidential mode and the normal mode, of the data storage device will now be described. This will include initial writing of user data in those modes, followed by access and modifying of the user data.

Confidential Mode

To enter the confidential mode, the switch 3 is operated to send a signal 4 to the FIM 27. In some examples, this signal can toggle between the modes. In other examples, the switch can enable a selection of a switch state that corresponds to a confidential or normal mode.

Actual use of the confidential mode further includes the FIM receiving 135, 130 valid DSD identifier 33 and a valid user identifier 35.

Method of Operation Writing in Confidential Mode

Figure 5:
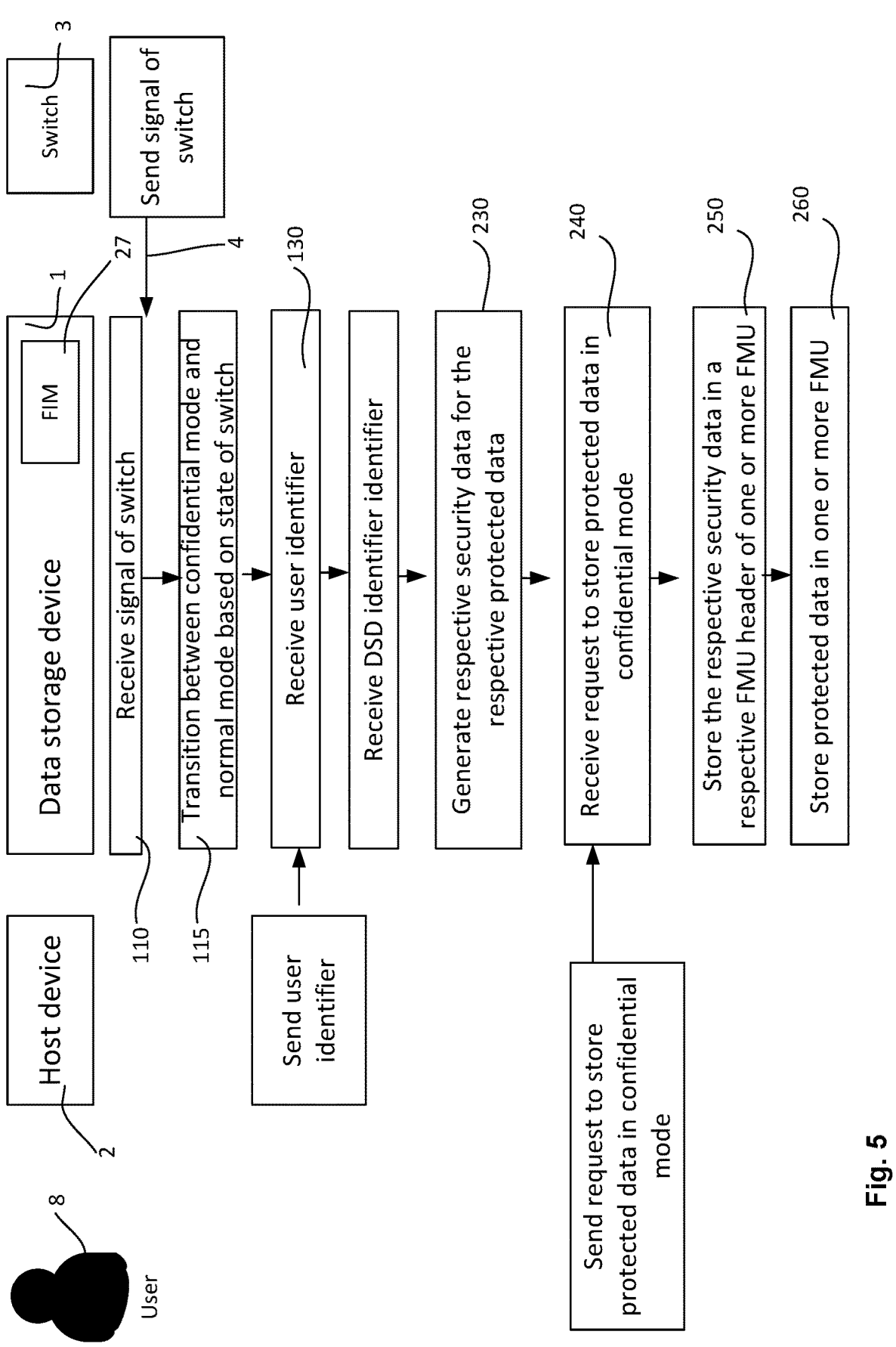
FIG. 5 is a flow diagram of a method of storing user data in a data storage device in a confidential mode.

FIG. 5 illustrates an example of writing user data 9 as protected data in the confidential mode. This includes receiving 110 a signal 4 of a switch indicating a user selection of the confidential mode, and subsequent transition 115 to the confidential mode. The method 100 include transitioning 115 to the confidential mode.

The user 8, via the host device 2, sends the user identifier 35 to the DSD 1, and in turn the FIM. The FIM also receives 135 the DSD identifier 33 of the DSD 1. This enables the FIM to generate 230 respective security data 7 for the respective protected data 11 to be stored at the one or more plurality of FMUs 27. The respective security data 7 is based on the DSD identifier 33 and the user identifier 35.

The method then includes receiving 240 a request to store protected data from the host device 2. This request may include the user data 11 to be stored.

The FIM is configured to store 250 the generated security data 7 in one or more FMU headers 24 of the one or more of the plurality of FMUs 27 that will be storing the user data 9. The user data 11 is then stored 260 as protected data at the at least one or more of the plurality of FMUs 27. If the user data 9 has data greater than what can be stored in one FMU, then the user data 9 may be divided up and stored at multiple FMUs 27. Each FMU that is used to store data in the confidential mode can have a respective FMU header containing respective security data 7.

In some examples, user data 9 that is stored as protected data 11 may be further encrypted by encryption engines 36. In some example, encryption of the user data 9 may be based, at least in part, with the generated security data 7. This provides an additional layer to prevent a nefarious user from reading the user data 9.

As noted above, the blocks of the storage device 13 may be selectively written in different processes.

In one process, with reference to FIG. 2, the DSD 1 may be configured so that two types of blocks are open for writing. This can include one block 32' to enable writing of data in confidential mode and another block 32" to enable writing in normal mode. When user enables the confidential mode path (for write/read operations), all writes/read will go to the confidential data block 32' until the user switch back to host normal data mode. Alternatively in the normal mode, the data will be written to data block 32". In this way the data written in confidential data mode will not be exposed when device is in host normal data mode. This also helps prevent data deletion when the device is in host normal data mode. In addition deletion (of unprotected data) is easy when device is in host normal data mode without impacting any of the confidential data.

In another process, with reference to FIG. 4, the DSD 1 is configured so that only one block is open for all incoming data. Say, for example, block 32"" of FIG. 4 is open to receive data in either the confidential mode or normal mode. When the user enables the host confidential mode, a data path is enabled to write to FMU 23"" that is then configured with respective security data 7 in the FMU header 24"". By having security data in the FMU and having data paths enabled at the FIM/FMU level, this prevents user(s) from accessing and exposing any confidential user data when in the normal mode. This also prevents deletion of user data 9 that is protected data 11 from being deleted in the normal mode. In this alternative process, if the DSD is configured to the normal mode, any data that is written will be stored in the FMU 23"" as unprotected data.

Method of Operation—Access or Modifying Data

An example method of accessing user data 9 in the confidential mode is illustrated in FIG. 3, which has been described in the overview above. This includes transitioning to the confidential mode in response to the signal 4 from the switch 3.

A user 8 may operate the host device 2 to send 185 requests to access or modify the protected data 11 in the confidential mode. This may include sending the user identifier 35, as part of the request, or it may be sent from the host device 2 as a separate message.

On receiving the request to access, the DSD 1 is further configured to identify one or more FMU 23 that contain the requested protected data 11. This can include identifying from previous data mapping, which particular blocks and FMU 23 contain the requested user data. For each of the identified one or more FMUs 27, the method includes receiving 120 corresponding security data 7 of the protected data 11. This can include receiving security data from the FMU header 24. In this step, the DSD 1 is configured to restrict reading of protected data 11 to only the FMU header 24 (i.e. not allowing reading of user data 9 in that FMU) until after the user is verified 150.

The method further includes verifying 150 the user 8 based on the respective security data 7 of the FMU 23 being consistent with the calculated security data 31. If verified, then the request to access the user data 9 in all the identified FMU 23 will be validated.

In this example, verifying each FMU from which user data 9 is requested provides additional security. In addition, since verification includes use of a DSD identifier 33 of the DSD 1, this ensures user data 9 stored in the confidential mode can only be accessed from that specific DSD 1.

Once the request to access is validated, the FIM 27 is configured to read user data 9 of FMUs and pass this user data to the host device 2. If modification of data is required, the user data 9 is read, modified, whereby the user data 9 is then written to a block (similar to the process noted above). In some examples, this includes writing the user data 9 to a new block and erasing data in the original block. In yet other examples, this can include temporarily storing the modified user data in memory, then erasing the original block corresponding to the FMU, and then writing the modified user data into the FMU of the erased block.

Normal (Host) Mode

If the user selects normal mode, the DSD 1 is configured to store data as unprotected data 12 in the DSD 1. In a write operation in the normal mode, the at least one FIM 27 selectively configures one or more of the plurality of unprotected FMUs 26 to store respective unprotected data. In one example, this can include writing the unprotected data in the FMU 26 as illustrated in FIG. 2. In alternative examples, when in the host mode a "dummy" user identifier 35. This dummy may be a generic key that is known, or where the DSD 1 enables any host device to use. This may be advantageous in maintaining a consistent header structure for FMUs in the DSD 1. In some examples, the normal mode may also use a "dummy" DSD identifier 33. These dummy identifiers may be stored in the storage medium 13, or other storage medium (or may be predefined in firmware), or otherwise publicly known.

When the DSD 1 is in the normal mode, the FIM 27 is configured to disable access to any user data in one or more of the plurality of FMUs 23 that contain protected data 11. That is, data that was written when the DSD 1 was in a confidential mode. This can be important to prevent cloning of user data in the plurality of FMUs 23 that contains protected data 11. This includes cloning of drive files containing that protected data as well as cloning of the entire drive (with protected data) to another drive.

Furthermore, when the DSD 1 is in the normal mode, the DSD may be configured to read, modify (or otherwise access) the unprotected data 12 in any of the corresponding unprotected FMU 26.

Garbage Collection

During garbage collection or relocation collection, the FIM 27 may decode the FMU headers to understand the nature of the protected data 11. Along with the user data 9, this process copies the security data 7 of the protected data to a destination block 32. Ideally, the destination block will be storing user data 9 for the same user 8, and therefore the FMU headers for FMUs will contain the same security data 7. Hence, even after relocation or garbage collection, the device will retain the confidential information of the file. This was informed by the user during host write operation, and the security data 7 generated at that time stays intact even if the files (of the user data 9) move around to different memory location in the flash drive.

This may be useful for situations as shown in the second block 32' of FIG. 4 where there are two FMU 23', 23" corresponding to two users. The data from these two FMU 23'. 23" may be moved to other secured blocks such that each block only holds protected data 11', 11" of one user for better block utilization. In such case, the protected data 11 from second block 32', as the source block, is written to the other block where the data includes the user data 9' with the security data 7' (whereby the latter is from the FMU header of the source block).

Advantages

Advantages of the present disclosure include providing a layer of data privacy and security at flash interface module 27 level. This can aid preserving privacy and security of sensitive data even if they have physical control of the storage medium (such as BGA-type NAND flash).

In some examples, when data is stored in the confidential mode, each flash module unit 23 has a respective FMU header 24 with security data 7. In addition to increasing to security at the FMU level, this also enables flexibility for users to scale the amount of user data to be stored in the confidential mode. That is, it is not necessary to pre-partition the storage medium with a set region for securing confidential user data.

In addition, as security data 7 (in some examples) is further based on the data storage device identifier 33, this can limit access to the protected user data 9 from being accessed by that specific data storage device 1.

Furthermore, confidential data can be stored anywhere in the physical memory and there can be preservation of that user data from being transferred from one data storage device to another storage medium. This preservation is enabled by the requirement of requiring verification with the user identifier 35 to prevent unauthorized transfer of user data.

The disclosed data storage device and method may also enable multiple users (or multiple user profiles) to securely store user data. In some examples, the number of users (or user profiles) are only limited to free memory blocks and respective FMU 23 that are available. The use in confidential mode of one user (with their own security data) will not affect the use of other users from securely storing that other user's confidential data.

In some examples, the separation of confidential data is provided in at least the block level so that one user cannot access, modify, or erase data of another user since the FIM 27 will bar access to those blocks without valid verification.

Variations

In some examples, the DSD identifier 33 and/or user identifier 35 may be a unique identifier associated with the DSD 1 and the user 8 respectively. While the DSD identifier 33 and the user identifier 35 can be used by the FIM 27 to identify/verify the specific DSD 1 and user 8, these identifiers (in some examples) may be obfuscated or kept secret.

In some examples, the DSD identifier 33 and/or user identifier 35 may include, at least in part, cryptographic keys. That is, having DSD identifier key and user identifier keys. This can include private cryptographic keys to enable authentication. In further examples, these can be used as cryptographic keys to further encrypt and obfuscate user data.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device (DSD) comprising:
a storage medium, wherein:
the storage medium comprises a plurality of blocks;
each block of the plurality of blocks is a smallest unit that can be erased;
each block comprises a plurality of flash memory units (FMU); and
each FMU of the plurality of FMUs is a smallest unit that can be read or written to; and
at least one flash interface module (FIM), wherein, in response to a signal of a switch, the at least one FIM is configured to selectively transition operation of the DSD between:
(i) a confidential mode, in which security data is stored with user data as protected data in at least one FMU in the storage medium of the DSD during a write operation, and the security data in the at least one FMU is used to validate subsequent requests to access or modify the corresponding stored user data in the at least one FMU; and
(ii) a normal mode, in which access to the protected data is prevented.

2. The DSD of claim 1, wherein the at least one FIM, in response to requests to access or modify the protected data from a host device and in the confidential mode, is configured to:
receive the corresponding security data of the protected data from the at least one FMU in the storage medium;
generate a calculated security data based on a DSD identifier of the DSD and a user identifier provided by the host device;
verify a user based on the corresponding security data being consistent with the calculated security data; and
in response to verifying the user, validate requests to access to enable a data path for the user data between the storage medium and the host device.

3. The DSD of to claim 2, wherein the DSD is configured to store the DSD identifier of the DSD in the storage medium or another storage medium of the DSD siloed from the storage medium.

4. The DSD of claim 2, wherein each FMU of the plurality of FMUs is configurable to store:
respective protected data in the confidential mode; or
respective unprotected data in the normal mode.

5. The DSD of claim 4, wherein, during a write operation in the confidential mode, the at least one FIM is configured to:
selectively configure one or more of the plurality of FMUs to store protected data in that FMU;
generate respective security data for the protected data in each FMU of the one or more of the plurality of FMUs based on the DSD identifier and the user identifier;
store the respective security data in a respective FMU header of each FMU of the one or more of the plurality of FMUs; and
store, at least in part, user data as protected data in each FMU of the one or more of the plurality of FMUs.

6. The DSD of claim 5, wherein the user data stored as protected data in each FMU of the one or more of the plurality of FMUs is encrypted, at least in part, with the respective security data for that FMU.

7. The DSD of claim 4, wherein at least one block of the plurality of blocks comprises:
at least one FMU configured to store the respective protected data in the confidential mode; and
at least one FMU configured to store the respective unprotected data in the normal mode.

8. The DSD of claim 5, wherein, in the normal mode, the at least one FIM is configured to:
disable access to any user data in the one or more of the plurality of FMUs that contains protected data; and
enable access to unprotected data in at least one FMU that contains unprotected data.

9. The DSD of claim 4, wherein, during a write operation in the normal mode, the at least one FIM is configured to selectively configure one or more of the plurality of FMUs to store the respective unprotected data.

10. The DSD of claim 1, wherein the switch comprises at least one of:
a hardware switch operable by a user; and/or
a software switch operable through a user interface of a host device.

11. A computer-implemented method for selectively enabling access to user data stored in a storage medium of a data storage device (DSD), the computer-implemented method performed, at least in part, by at least one flash interface module (FIM) of the DSD, the method comprising:
receiving a signal from a switch; and
transitioning, in response to the signal, operation between:
(i) a confidential mode, in which security data is stored with user data as protected data in at least one flash memory unit (FMU) in the storage medium of the DSD during a write operation, wherein:
the storage medium comprises a plurality of blocks;
each block of the plurality of blocks is a smallest unit that can be erased;
each block comprises a plurality of FMUs; and
each FMU of the plurality of FMUs is a smallest unit that can be read or written to; and
the security data in the at least one FMU is used to validate subsequent requests to access or modify the corresponding stored user data in the at least one FMU; and
(ii) a normal mode, in which access to the protected data is prevented.

12. The computer-implemented method of to claim 11, further comprising, in response to requests to access or modify the protected data from a host device in the confidential mode:
receiving corresponding security data of the protected data from the at least one FMU in the storage medium;
generating a calculated security data based on a DSD identifier of the DSD and a user identifier provided by the host device;
verifying a user based on the corresponding security data being consistent with the calculated security data; and
in response to verifying the user, validating requests to access to enable a data path for the user data between the storage medium and the host device.

13. The computer-implemented method of claim 12, further comprising:
receiving, from the host device, the user identifier, wherein the user identifier is a secret associated with the user.

14. The computer-implemented method of claim 12, further comprising:

receiving the DSD identifier from the storage medium or another storage medium of the DSD siloed from the storage medium.

15. The computer-implemented method of claim 12, further comprising, in response to requests to access or modify the protected data:

identifying one or more of the plurality of FMUs that contain the requested protected data;

for each FMU of the identified one or more of the plurality of FMUs, verifying the user based on the respective security data of the FMU being consistent with the calculated security data; and in response to verifying the user, validating the request to access the protected data in the identified one or more of the plurality of FMUs.

16. The computer-implemented method of claim 12, further comprising, during a write operation in the confidential mode:

selectively configuring, by the at least one FIM, one or more of the plurality of FMUs to store respective protected data;

generating respective security data for the respective protected data to be stored in the one or more of the plurality of FMUs, wherein the respective security data is based on the DSD identifier and the user identifier;

storing the respective security data in a respective FMU header of each FMU of the one or more of the plurality of FMUs; and storing, at least in part, protected user data in each FMU of the one or more of the plurality of FMUs.

17. The computer-implemented method of claim 16, wherein storing the protected user data further comprises encrypting the user data, at least in part, with the respective security data.

18. The computer-implemented method of claim 15, wherein:

the respective security data for each FMU of the one or more of the plurality of FMUs is stored in a corresponding FMU header of that FMU; and receiving corresponding security data of the protected data from the at least one FMU in the storage medium includes receiving the respective security data from the FMU header of that FMU.

19. A data storage device (DSD) comprising:

means for storing data, wherein:

the means for storing data comprises a plurality of blocks;

each block of the plurality of blocks is a smallest unit that can be erased;

each block comprises a plurality of flash memory units (FMU); and each FMU of the plurality of FMUs is a smallest unit that can be read or written to;

means for receiving a signal from a switch; and means for transitioning operation, in response to the signal, configured to selectively transition operation of the DSD between:

(i) a confidential mode in which security data is stored with user data, as protected data in at least one FMU in the means for storing data during a write operation, and the security data in the at least one FMU is used to validate subsequent requests to access or modify the corresponding stored user data in the at least one FMU; and (ii) a normal mode, in which access to the protected data is prevented.

20. The DSD of claim 19, further comprising:

means for receiving requests to access or modify the protected data from a host device in the confidential mode;

means for receiving corresponding security data of the protected data from the means for storing data;

means for generating a calculated security data based on a DSD identifier of the DSD and a user identifier;

means for verifying a user based on the corresponding security data being consistent with the calculated security data; and means for validating, in response to the verifying the user, requests to access or modify to enable a data path for the user data between the means for storing data and the host device in the confidential mode.

* * * * *